United States Patent [19]
Wang et al.

[11] Patent Number: 5,838,745
[45] Date of Patent: Nov. 17, 1998

[54] SYNCHRONIZATION METHOD, AND ASSOCIATED CIRCUITRY, FOR IMPROVED SYNCHRONIZATION OF A RECEIVER WITH A TRANSMITTER USING NONLINEAR TRANSFORMATION METRICS

[75] Inventors: Eric Yi-Pin Wang, Raleigh; Amer Hassan; Torbjorn Solve, both of Cary, all of N.C.

[73] Assignee: Ericsson Inc., Research Triangle Park, N.C.

[21] Appl. No.: 728,179

[22] Filed: Oct. 9, 1996

[51] Int. Cl.$^6$ .................................................... H04L 7/06
[52] U.S. Cl. .......................... 375/364; 375/368; 370/510; 370/512; 370/514
[58] Field of Search ..................................... 375/354, 362, 375/365, 368; 370/503, 509, 510, 512–514, 520

[56] References Cited

U.S. PATENT DOCUMENTS

| | | | |
|---|---|---|---|
| 5,390,216 | 2/1995 | Bilitza et al. | 375/354 |
| 5,444,697 | 8/1995 | Leung et al. | 370/207 |

*Primary Examiner*—Amanda Le
*Attorney, Agent, or Firm*—Jenkens & Gilchrist

[57] ABSTRACT

A synchronization method and apparatus for synchronizing a receiver, such as a radiotelephone operable in a cellular communication system with a transmitter. Synchronization signals are transmitted as parts of a control signal to the receiver. Such synchronization signals are of high margins and also permit synchronization of the radiotelephone responsive to a reduced number of calculations. The time for such synchronization is reduced by use of nonlinear transformation metrics, such as logarithmic metrics, which reduce the impact of a noise or error component within the control signal.

45 Claims, 2 Drawing Sheets

SYNCHRONIZATION METHOD, AND ASSOCIATED CIRCUITRY, FOR IMPROVED SYNCHRONIZATION OF A RECEIVER WITH A TRANSMITTER USING NONLINEAR TRANSFORMATION METRICS

The present invention relates generally to synchronization methods and apparatus for synchronizing a receiver, such as in a radiotelephone operable in a cellular communication system, with a transmitter which transmits signals to the receiver. Particularly, the present invention relates to a synchronization method, and associated circuitry, in which digitally-encoded synchronization signals are transmitted to the receiver and used by the receiver to synchronize the receiver with the transmitter. More particularly, the present invention relates to a synchronization method, and associated circuitry, in which synchronization is performed using nonlinear transformation metrics, such as logarithmic metrics, thereby reducing the impact of the error component in a synchronization calculation and reducing both the amount of computation and time required to achieve synchronization.

The synchronization signals are of characteristics which permit their detection by the receiver through a correlation process of reduced complexity. Synchronization of the receiver is effectuated quickly as only a reduced number of calculations is required to detect the synchronization signals.

The synchronization signals are of high margin to facilitate their detection by the receiver even when the signals are transmitted upon a communication channel subjected to high levels of attenuation or multi-path distortion. Because the synchronization signals are digitally-encoded, the signals can be transmitted in a time division multiplex (TDM) communication scheme, such as those used in several, conventional, cellular communication systems. The present invention is, therefore, advantageously embodied in a cellular communication system, such as a terrestrial-cellular communication system or a satellite-cellular communication system. When transmitted during selected time slots to form portions of a control signal generated on control channels by a cellular network station to a radiotelephone, and the radiotelephone, responsive to the detection of the synchronization signals, becomes synchronized to the transmitter, both to receive other portions of the control signal and other signals generated upon other data or voice channels.

BACKGROUND OF THE INVENTION

A communication system is formed, at a minimum, by a transmitter and a receiver interconnected by a communication channel. Communication signals transmitted by the transmitter are transmitted upon the communication channel to be received by the receiver.

A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A cellular communication system is a type of radio communication system. When the infrastructure, hereinafter referred to as the network, of the cellular communication system is installed throughout a geographical area, a subscriber to the cellular system is generally able to communicate telephonically in the system when positioned at any location in the geographical area encompassed by the system.

While conventional, terrestrial-cellular communication networks have been installed throughout significant portions of the world, some areas are without such networks. In areas of low population density, for instance, a terrestrial-cellular communication network might not be commercially viable. Also, existing, terrestrial-cellular networks have also been constructed pursuant to various different standards.

A radiotelephone, i.e., a hand-held or cellular telephone, operable in one of the communication systems is sometimes not operable in other such systems. Even in an area in which a cellular communication network has been installed, a user might not be able to communicate pursuant thereto if the user attempts to utilize a radiotelephone constructed to be operable only with another one of the cellular communication networks.

Satellite-cellular communication systems, such as the Association of South East Asian Nations' (ASEAN) Cellular Satellite (ACeS) system which is designed to provide telephone coverage by use of a geostationary satellite, have been proposed which, when implemented, shall permit a user to communicate telephonically by way of the satellite-cellular communication system when positioned at almost any location. By transmitting down-link signals between a satellite-based transceiver and the radiotelephone and up-link signals between the radiotelephone and the satellite-based transceiver, telephonic communication shall be possible between the radiotelephone and the satellite-based transceiver. By effectuating additional communication links between the satellite-based transceiver and a ground station, the user of the radiotelephone shall be able to communicate telephonically with another party by way of the ground station and the satellite-based transceiver.

Because of the inherent efficiencies of digital communication techniques, many already-installed cellular communication networks have been converted, and many newly-proposed cellular communication systems, such as the ACeS system, are being designed, to utilize digital communication techniques. Other communication systems similarly utilize, or are planned to be converted to or to utilize, digital communication techniques.

To function properly, particularly when the communication system utilizes digital communication techniques, the radiotelephone must be synchronized with a network station of the cellular communication network. Conventionally, synchronization signals are transmitted by the network station to the radiotelephone to synchronize the radiotelephone with the network station. Other communication systems similarly utilize conventional, synchronization signals for similar purposes.

In a TDM communication system, such as a time division multiple access (TDMA) system, communication is effectuated by the use of frames. In TDMA, a given frequency band is divided into a series of discrete frames each having a series of discrete timeslots therein, each timeslot for use by a different subscriber. Although many systems utilize eight timeslots per frame, ACeS provides for multiple users per time slot, effectively becoming a 16- or 32-slot system. During each timeslot, information may be transmitted in burst form in accordance with a particular digital bit configuration. A normal burst is the transfer of speech or data information. Other burst types include high power synchronization bursts, groups of which form the aforementioned synchronization signals, which are preferably unevenly spaced across many frames within a multiframe, i.e., 102 consecutive frames in the ACeS system. The initial high-power synchronization burst in such a signal, however, is placed at the start of the first frame in a multiframe, signaling the multiframe boundary, and the remaining synchronization bursts, usually three, which could constitute high-power broadcast bursts, are unevenly spaced from the initial sync burst within the multiframe by known offsets.

It is readily apparent, however, that a radiotelephone or cellular phone, upon initial power up, is not synchronized with the digital bit stream emanating from the transmitter and must ascertain the multiframe boundary, i.e., the start of the initial synchronization burst, within that bit stream. Once the first sync burst and the multiframe boundary are found, the receiver is then in sync with the transmission. However, many multiframes of the transmission may transpire and a significant number of processing steps performed before synchronization is achieved.

Conventionally, two types of synchronization are performed: coarse and fine. Coarse synchronization is designed to narrow the bit stream selection to a particular portion of consecutive bits hopefully containing the initial high-power sync burst. Fine synchronization then determines the exact location of the initial sync burst within that portion by correlating or matching a segment of the selected consecutive bits to a bit pattern, and shifting the segment bit by bit until correlation and synchronization are achieved. The focus of the present invention, however, is to achieve faster coarse synchronization.

In addition to synchronization bursts, other high-power bursts are present in the digital bit stream which could interfere with the coarse synchronization procedure. Also, high-power paging bursts may be present, particularly in an ACeS environment, to contact difficult-to-reach subscribers. The presence of these other high-powered, non-synchronization bursts in the bit stream complicates sync acquisition. Conventionally, coarse synchronization is achieved within a first-order number, N, of operations, where N is dependent primarily upon the amount of noise and the amount of non-synchronization high-power bursts present. For example, when the signals transmitted to the receiver are subjected to high levels of attenuation or multi-path distortion, synchronization is more difficult as the bit stream might be distorted or attenuated during their transmission to the receiver.

Any manner to achieve synchronization, despite the presence of these other non-synchronization high-power bursts in the transmitted bit stream, requiring a lesser number of processing steps and time would be advantageous.

One technique for the synchronization of a receiver with a transmitter, such as a radiotelephone of a cellular communication system, which reduces the number of processing steps, is set forth in a related, commonly-assigned and co-pending patent application of the present inventor, U.S. application Ser. No. 08/727,370, filed on Oct. 8, 199 entitled: "Synchronization Method, and Associated Circuitry, for Improved synchronization of a Receiver with a Transmitter Using Early-Late Testing During Coarse Synchronization", filed concurrently herewith, and incorporated herein by reference. According to the related application, digitally-encoded synchronization sequences are transmitted by the transmitter to the receiver, and the receiver synchronizes itself to the synchronization sequences which are transmitted pursuant to a selected format.

In particular, the related patent application utilizes a power profile method during coarse synchronization to calculate the energy accumulated in each of a plurality of bins, i.e., subunits of a timeslot, and, through use of a priori knowledge about the spacings between high-power synchronization bursts, combines the energy accumulated in the bins to ascertain the correct multiframe boundary and thereby facilitate synchronization. At a signal to noise (C/N) ratio equal to 10 dB, e.g., noise variance is ten times signal strength, it has been found that a phone can acquire coarse synchronization within 10 multiframes using the aforedescribed power profile method. Accordingly, the time required to achieve synchronization is about 4.7 seconds (10×0.47 seconds per ACeS multiframe).

It is, accordingly, an object of the present invention to provide a technique for improved synchronization performance by reducing the impact of the error component in a coarse synchronization calculation and reducing the number of multiframes required to achieve coarse synchronization, thereby reducing the amount of time necessary to acquire synchronization.

It is a more particular object of the present invention to accomplish the aforesaid calculation and time reduction by use of nonlinear transformation metrics, more particularly, to compress the amount of calculations by use of logarithmic transformation metrics.

SUMMARY OF THE INVENTION

The present invention advantageously provides an improved synchronization method, and associated circuitry, for achieving coarse synchronization of a transmitter with a receiver, such as a radiotelephone operable in a cellular communication system.

The digitally-encoded synchronization signals are transmitted and the receiver receives and coarsely synchronizes itself to these signals using a nonlinear metric, such as a logarithmic metric, reducing the number of calculations and the amount of time necessary to achieve the initial coarse synchronization with the transmitter by reducing the impact of the error component present within the time samples of the synchronization signals.

The circuitry and its associated synchronization method of the present invention are advantageously utilized in a cellular communication system to synchronize radiotelephones operable therein to a network station. In a terrestrial-cellular communication system, the synchronizing signals are transmitted to the radiotelephone as portions of a control signal generated at a cellular base station. In a satellite-cellular communication system, the synchronizing signals form portions of a control signal generated at a network control center or a ground station and are transmitted to the radiotelephone by way of a satellite-based transceiver.

In these and other aspects, therefore, a method, and associated circuitry, synchronizes a receiver with a transmitter. The receiver and the transmitter are coupled together by way of a communication channel. A control signal is transmitted from the transmitter upon the communication channel. The control signal is formatted pursuant to a multiframe format and includes synchronization signals therein. The digital bit stream constituting the control signal is detected at the receiver, and the receiver sums the energies within a plurality of high-power burst bins, the energies accumulated within those bins being calculated using a nonlinear power metric, particularly, a logarithmic power metric, thereby to achieve improved coarse synchronization between the receiver and the transmitter with less computational error, fewer calculations and less time.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

Figure 1:
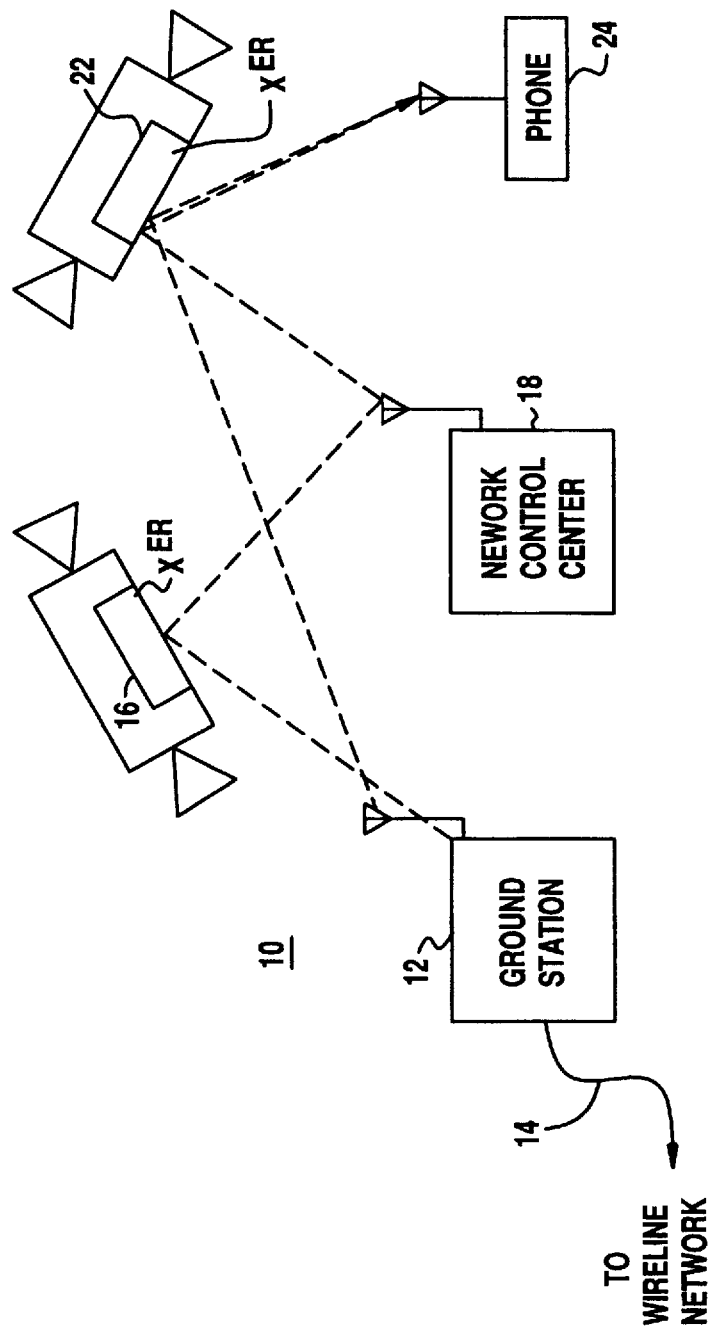
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and carries out the methodology, of an embodiment of the present invention. While the communication system 10 of the illustrated embodiment forms a satellite-cellular communication system, it should be understood at the outset that the circuitry and methodology of the present invention can analogously be embodied in other types of communication systems, including, for instance, a terrestrial-cellular communication system or other type of radiotelephonic communication system.

The communication system 10 includes at least one ground station 12 coupled to a wireline telephonic network. Such coupling is represented in the figure by the lines 14 extending from the ground station 12.

The ground station 12 includes transceiver circuitry for transceiving communication signals, inter alia, with a satellite-based transceiver 16. The satellite-based transceiver is operable to transceive communication signals not only with the ground station 12 but also with other land-based devices, such as the transceiver circuitry of a network control center 18. The transceiver 16 is here operable primarily as a relay station for relaying signals generated at the ground station 12 to the network control center 18 and vice-versa. The transceiver 16 preferably further includes control circuitry permitting the frequency channels upon which the signals transmitted to the transceiver 16, to be relayed therefrom, to be altered to most efficiently utilize the frequency channels allocated for communication in the communication system 10.

Transceiver circuitry of the network control center 18, in turn, is able to transceive communication signals with other satellite-based transceivers, such as a transceiver 22. The transceiver 22, similar to the transceiver 16 transceives communication signals with land-based transceivers including, for example, a radiotelephone 24. Again, the transceiver 22 is primarily operable to relay communication signals transmitted thereto, and again preferably includes control circuitry for selecting the frequency channels upon which signals transmitted thereto are relayed to other communication stations.

Communication pursuant to the communication system 10 permits a user of a radiotelephone 24 to communicate telephonically when positioned at any location throughout large areas of the world. As long as the user of the radiotelephone 24 is positioned to permit transmission and reception of communication signals with a satellite-based transceiver, the user is able to communicate telephonically with a user of another radiotelephone or to a telephonic device of a conventional, wireline network.

To operate properly, however, the radiotelephone 24 must be synchronized with the cellular network. Once properly synchronized, voice or other communications can be effectuated between the radiotelephone and the cellular network.

As described in the aforementioned related application, coarse synchronization between a receiver, such as the radiotelephone 24, and a transmitting station, such as the cellular network, may be achieved using a linear power profile method. According to this method, synchronization is effectuated by use of energy bin calculations of the synchronization sequences transmitted along a communication channel, and, through use of high-margin, high-power synchronization sequences, adequate transmission was ensured despite significant levels of attenuation or multi-path distortion.

A satellite communication system, of which the communication system 10 of the present invention is exemplary, is, like that described in the related application, a communication system in which power signals are transmitted between the satellite of the communication system and the radiotelephone 24. Therefore, a signal to noise power ratio, C/N, is typically of a relatively low value. If an antenna at the radiotelephone is not oriented to detect the best signals transmitted thereto, the signal to noise ratio of signals actually received by the radiotelephone are even further reduced. In the proposed ACeS, satellite-cellular communication system, paging signals are required to be transmitted at a margin of thirty decibels over average white gaussian noise (AWGN). Such a requirement corresponds, generally, in a radiotelephone of sensitivity to detect a paging signal having a C/N ratio of about minus ten decibels. As a radiotelephone must be synchronized with the cellular network to properly receive the paging signal, the communication system requires a high margin synchronization capability to allow synchronization in the presence of these other, high-power non-synchronization signals. It should be understood that although the initial synchronization burst, i.e., the one demarcating the multiframe boundary, is a high power sync burst, the remaining three "synchronization" bursts may constitute high-power broadcast signals. A synchronization pattern may, therefore, include such broadcast signals functioning as synchronization bursts.

The present invention provides an improved method and apparatus for better distinguishing between the afore-described non-synchronization, high-power bursts and the desired synchronization bursts, allowing the radiotelephone to become synchronized with the network. In a preferred embodiment of the present invention, synchronization is a two-step process. Coarse synchronization is first effectuated; thereafter, fine synchronization is effectuated. During coarse synchronization, high-power synchronization (HPS) bursts, which as discussed may be accompanied by some high-power broadcast (HPB) bursts also, permit synchronization of the radiotelephone to a first level of synchronization despite the presence of unrelated high-power bursts, such as due to paging. And, during the subsequent fine synchronization, acquisition to within a single symbol bit is possible; also, a more precise frequency offset is provided. The subject matter of the present invention is concerned primarily, albeit not exclusively, with achieving coarse synchronization quickly and accurately.

When the radiotelephone 24 is turned on, the device begins a coarse synchronization procedure. The coarse synchronization process reduces the time (and frequency) uncertainty to a selected level which in turn reduces the number of operations required to perform fine synchronization. In one embodiment, the radiotelephone searches all possible primary carriers when the radiotelephone is turned on. A primary carrier is the carrier which multiplexes the control channels. In another embodiment, the radiotelephone is assumed to have pre-registered in a region using the nominal control channels prior to receiving paging signals.

In either embodiment, system synchronization is effectuated by utilizing high-power bursts within the transmission stream which include predetermined patterns of synchronization bursts. The bursts are time-multiplexed with other control channels and traffic channels, such as the high-powered broadcast signals on the broadcast control channel (BCCH), a paging channel or other transmission channels.

Although the sequencing schemes set forth in the related patent application effectuate coarse synchronization rather quickly and at high margin to facilitate detection, the present invention is directed to further improvements in this art.

Conventional techniques for coarse synchronization, such as the power profile method or "linear" power metrics utilized in the related patent application, compute a summation of discrete power samples to calculate the amount of energy accumulated within a plurality of bins making up the synchronization pattern.

It should be understood that a bin, being a subunit of a timeslot, constitutes a plurality of discrete, consecutive bits therein. There are typically 4 bins within a timeslot. Thus, the amount of energy accumulated in a given bin is the sum of the energies accumulated in the respective corresponding bits therein, e.g., in a timeslot with a conventional 156.25 bit format, a bin may constitute a fraction of that amount, which with 4 bins per timeslot is equivalent to approximately 39.0625 bits. Accordingly, all of the discrete bit energies are summed to compute the energy for that particular bin. Since a high-power burst within a given timeslot fills all four bins therein, the energy summation for a high-power burst signal is considerably higher than a normal burst.

The received signal sample at a given bit i may be represented by $r_i$, a complex number, where $$r_i = s_i + n_i \qquad (1)$$

It should be understood that $s_i$ is the signal component of $r_i$, and $n_i$ is the noise component of $r_i$. In more detail, $s_i = s_{I,i} + js_{Q,i}$, where $s_{I,i}$ represents the signal component of the in-phase channel, j represents the imaginary square root of minus one, and $S_{Q,i}$ represents the signal component of the quadrature-phase channel, orthogonal to the in-phase channel. Similarly, $n_i = n_{I,i} + jn_{Q,i}$. The conventional, linear transformation, power metrics approach utilizes a bin metric (B) which is used to calculate the energy accumulated in a bin l by the formula:

$$B_l = \sum_{i=x}^{y} |r_i|^2 = \sum_{i=x}^{y} (|s_i|^2 + s_i n_i^* + n_i s_i^* + |n_i|^2) \qquad (2)$$

where the summation is over the received signal samples over the respective bits in bin l, i.e., from the initial bit starting bin l, at x, to the ending bin bit, at y. The "*" means a complex conjugate of the indicated variable. As is apparent from equation (2), the conventional power metric approach enhances the noise component by introducing the $|n_i|^2$ component after squaring it. Consequently, when the signal-to-noise ratio is very small for $r_i$, i.e., a noisy channel where $n_i$ is large, $|r_i|^2$ has an even smaller signal-to-noise ratio. The aforementioned bin metric B is then used to calculate the energies within other bins, e.g., other synchronization bins, and the resultant sum used to make decisions on synchronization time. For a further discussion of the summation of bin metric (B) energies see the aforementioned related co-pending patent application.

Alternatively, an integration may be used to calculate the energy accumulated in the bin l by the formula:

$$B_l = \int_x^y |r(t)|^2 dt = \int_x^y (|s(t)|^2 + s(t)n^*(t) + n(t)s^*(t) + |n(t)|^2) dt \qquad (3)$$

where r(t) represents a function integrated over the range t=x to t=y, i.e., over the respective bits therein, i.e., from the start bit x to the end bit y. However, it should be understood that although the summation equation calculates and accumulates the discrete energy values within each of the bits within bin l, the integration technique performs the bin energy calculation without sampling. Similarly, the functions s(t) and n(t), representing signal and noise functions for r(t), respectively, and their corresponding complex conjugate functions, $s^*(t)$ and $n^*(t)$, are integrated over the same range.

The present invention attempts to minimize the noise component of the signal as much as possible by employing nonlinear transformations to the received signal power as the metric for coarse synchronization, particularly a logarithmic metric. Thus, instead of calculating a respective bin energy linearly in accordance with equation (2), and amplifying the effect of the noise component, a different equation is proposed:

$$B_l = \sum_{i=x}^{y} \log |r_i|^2 = 2 \sum_{i=x}^{y} \log |s_i + n_i| \qquad (4)$$

As is apparent from a comparison between equations (2) and (4), the signal-to-noise ratio for $\log(|s_i + n_i|)$ is higher than that of $r_i$ when $r_i$ has a C/N less than zero. Accordingly, the noise contribution of the signal is compressed or minimized by use of the above nonlinear, logarithmic metric (4) in the coarse synchronization process.

Alternatively, an integration, as with equation (3), may be used:

$$B_l = \int_x^y \log |r(t)|^2 dt = 2 \int_x^y \log |s(t)| dt \qquad (5)$$

which also compresses the noise component.

Furthermore, by use of this technique in an ACeS system, it has been discovered that the cellular telephone 24 can acquire the initial coarse synchronization within about 6 multiframes, i.e., about 2.82 seconds, a 40% time improvement over the aforedetermined linear power metrics approach set forth in the related application, which required ten multiframes and about 4.7 seconds.

Other nonlinear transforms (F) suitable for purposes of the present invention include but are not limited to: the absolute value of the received signal samples, i.e., the modulus, obtained by taking the square root of the product of the received signal sample $r_i$, which could constitute a complex number, with its complex conjugate, $r_i^*$:

$$F_i = \sqrt{r_i r_i^*}, \qquad (6)$$

a generalization of the above transformation (6) to obtain the n-th root:

$$F_i = |r_i r_i^*|^{1/n}, \qquad (7)$$

the logarithm of the received signal power, which when generalized becomes:

$$F_i = \log |r_i r_i^*|^{1/n}, \qquad (8)$$

and the respective functional equivalents of the above transformations (6) to (8):

$$F = \sqrt{r(t)r^*(t)} ,\qquad(9)$$

$$F = |r(t)r^*(t)|^{1/n},\qquad(10)$$

$$F = \log |r(t)r^*(t)|^{1/n},\qquad(11)$$

and combinations of the above transformations.

Through use of any of the above non-linear transformative equations, the contribution of the noise component within the signal is reduced, resulting in a better signal. As described more fully in the co-pending application, when summing the bin metrics of a given portion of the bit stream (constituting the control signal transmission) and the other unevenly displaced portions therefrom, the amount of energy accumulated is compared to other such summations throughout the multiframe, and the maximum energy value, representing the best pattern match is selected. Since the multiframe boundary is probably near that selection, fine synchronization, i.e., a cumbersome and computationally intense bit shifting process to achieve precise bit-wise synchronization, is greatly facilitated.

For mobile-satellite applications such as in ACeS, where synchronization at −10 dB is required, it has been found that the logarithmic transformation of the received signal power (3) is an attractive choice for the aforedescribed noise suppression properties.

The synchronization improvements of the present invention are further benefited through the use of early-late tests in combination with the aforedescribed nonlinear metrics. Since synchronization relies upon high-power burst patterns, the presence of other high-power bursts on the same control channel carrier may cause synchronization problems. Through the use of early-late test metrics, disclosed in the aforedescribed corresponding patent application of one of the present inventors, incorporated herein by reference, these problems are alleviated.

Figure 2:
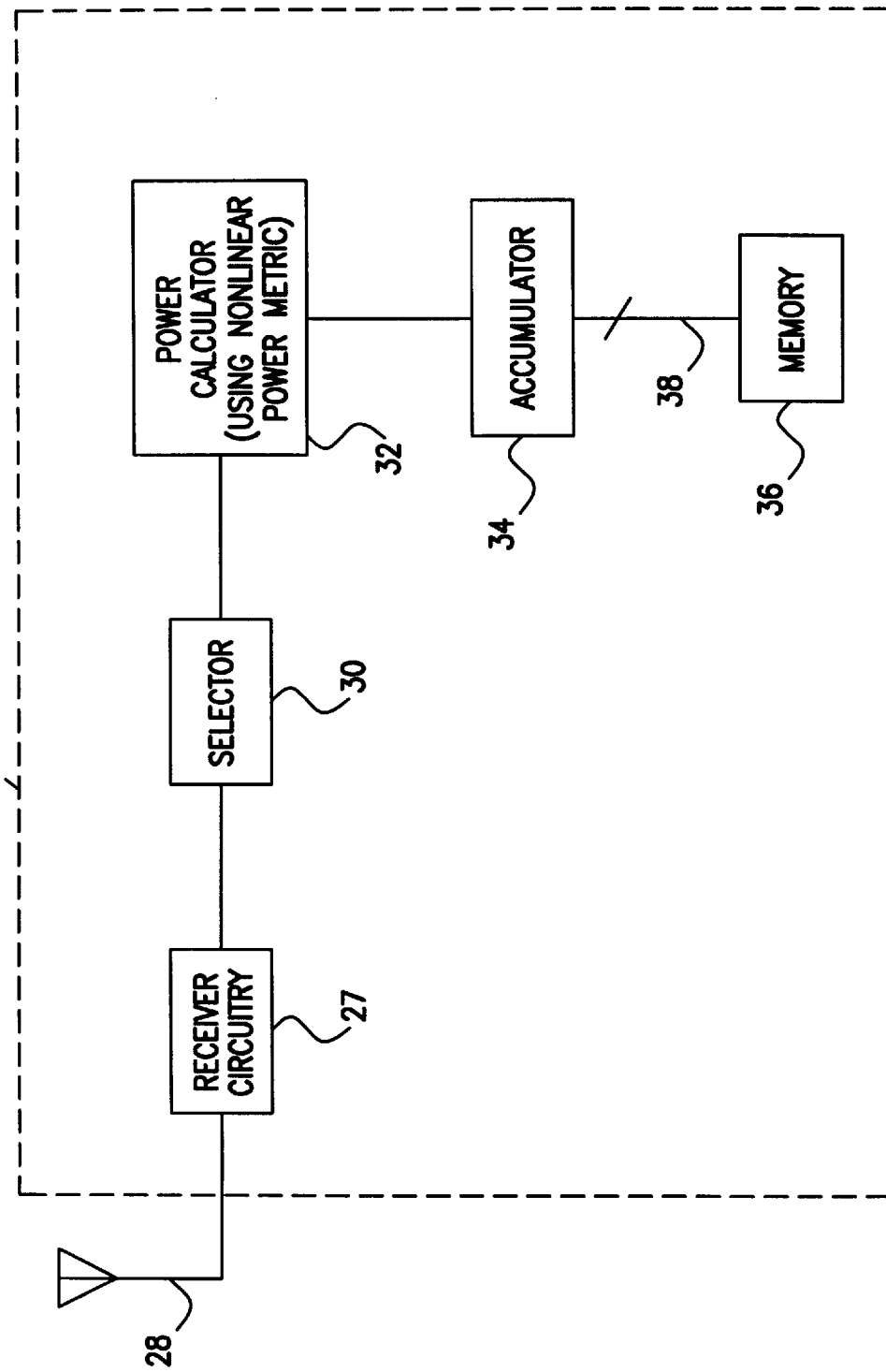
FIG. 2 illustrates a functional block diagram of a portion of a radiotelephone in accordance with an embodiment of the present invention.

With reference now to FIG. 2 of the drawings, there is shown a block diagram of a portion of radiotelephone 24, such as a cellular phone which receives control signals transmitted thereto, such as from the network control center 18 through transceiver 22 shown in FIG. 1. The radiotelephone 24 includes receiver circuitry 27 tunable to detect and receive signals transmitted to the radiotelephone through an antennae 28. Signals representative of the received signals are applied to a selector 30 which is operable to select portions of the in-coming received signal for analysis. In particular, selector 30 divides the control signal into consecutive portions which are individually processed, as described below. It should be understood, however, that selector 30 may focus the selection process, e.g., be more responsive to high-power bursts, in an effort to concentrate the search for the initial sync burst signifying the multiframe boundary.

The energy accumulated within the selected portions, such as the energy within a given bin, is then computed, using the aforedescribed nonlinear power metrics. A power calculator 32 sums the energies accumulated within the respective bits within the bin. This energy sum may then be passed to an accumulator 34 which adds the new sum to previous sums, e.g., in calculating energies contained in disparate bins using early late tests in accordance with the disclosure set forth in the co-pending patent application. The sum in accumulator 34 may then be compared with an amount stored in a memory 36 using a shift register 38, and the sum in accumulator 34 may be exchanged with that in memory 36 if a given condition is met, e.g., the sum in accumulator 34 is greater. Other information about the particular bin, e.g., index information, may also be stored in memory 36 to reference the particular value(s) therein. In this manner, a given bin within a bit stream of control data exhibiting the best likelihood of being a part of the sync burst, marking the multiframe boundary, may be determined and fine synchronization commenced.

It should be understood that although the synchronization burst pattern transmitted within each multiframe may consist of all high-power synchronization bursts, other high-power bursts, such as from the broadcast channel, may function as synchronization bursts. The reason for this is that the energy accumulation technique employed in the present invention and the related application does not discern the source of the energy, merely its presence. Thus, the broadcast channels, which typically transmit at a normal lower power level, when broadcasting at full power, act as a synchronization burst.

The previous descriptions are of preferred examples for implementing the invention, and the scope of the invention should not necessarily be limited by this description. The scope of the present invention is instead defined by the following claims.

What is claimed is:

1. A method for coarse synchronization of a receiver with a transmitter using a nonlinear power metric, the receiver and the transmitter coupled together by way of a communication channel, said method comprising the steps of:

transmitting, from the transmitter, a control signal upon the communication channel, the control signal being divided into a succession of consecutive multiframes, each of said multiframes comprising a multiplicity of discrete frames therein, and each of said multiframes comprising at least one high-power synchronization signal therein;

detecting, at the receiver, the control signal transmitted during said step of transmitting;

selecting a given portion of the control signal within a given multiframe; and calculating the energy accumulated within said given portion using said nonlinear power metric.

2. The method according to claim 1, wherein, in said step of transmitting, each of said multiframes comprise a multiplicity of high-power synchronization signals therein, said synchronization signals being spaced within each multiframe in accordance with a pattern and respectively separated by unequal offsets, a plurality of said multiframes further comprising other, non-synchronization, high-power signals therein;

wherein, in said step of detecting, the receiver also detects the other signals;

wherein, in said step of selecting, said given portion contains a high-power signal within said given multiframe;

wherein, in said step of calculating, further calculating the energies accumulated within a plurality of other portions of said control signal, offset from said given portion in accordance with said pattern, and using said nonlinear power metric; and further comprising the steps of:

summing the energies accumulated within the given and other portions of said control signal; and comparing the energy sum accumulated in said step of summing to a corresponding energy sum for different given and other portions within said given multiframe determined in accordance with said method, the maximum energy sum within said given multi-frame being selected for subsequent fine synchronization.

3. The method of claim 1, wherein said nonlinear power metric is a logarithmic power metric.

4. The method according to claim 3, wherein the step of calculating using said nonlinear power metric calculates the energy accumulated in said given portion of said control signal according to the formula:

$$B_l = \sum_{i=x}^{y} \log |r_i|^2 = 2 \sum_{i=x}^{y} \log |s_i + n_i|$$

where $r_i$ represents the received signal sample within a respective bit i within said given portion, where i ranges from x to y, $s_i$ and $n_i$ respectively represent the signal and noise components of $r_i$, and $B_l$ represents the accumulated energy within said given portion.

5. The method according to claim 3, wherein the step of calculating using said nonlinear power metric calculates the energy accumulated in said given portion of said control signal according to the formula:

$$B_l = \int_{x}^{y} \log |r(t)|^2 dt = 2 \int_{x}^{y} \log (|s(t) + n(t)|) dt$$

where r(t) represents a function integrated over the range of t=x to t=y corresponding to said given portion, s(t) and n(t) respectively represent signal and noise functions for r(t), and $B_l$ represents the accumulated energy within said given portion.

6. The method according to claim 3, wherein the step of calculating using said nonlinear power metric calculates the energy accumulated in said given portion of said control signal according to the formula:

$$B_l = \sum_{i=x}^{y} \log |r_i r_i^*|^{1/n}$$

where $r_i$ represents the received signal sample within a respective bit i within said given portion, where i ranges from x to y, $r_i^*$ represents the complex conjugate of $r_i$, n is a number greater than 1, and $B_l$ represents the accumulated energy within said given portion.

7. The method according to claim 6, wherein n equals 2.

8. The method according to claim 3, wherein the step of calculating using said nonlinear power metric calculates the energy accumulated in said given portion of said control signal according to the formula:

$$B_l = \int_{x}^{y} \log |r(t) r^*(t)|^{1/n}$$

where r(t) represents a function integrated over the range of t=x to t=y corresponding to said given portion, $r^*(t)$ represents the complex conjugate function of r(t), n is a number greater than 1, and $B_l$ represents the accumulated energy within said given portion.

9. The method according to claim 8, where n equals 2.

10. The method according to claim 1, wherein the step of calculating using said nonlinear power metric calculates the energy accumulated in said given portion of said control signal according to the formula:

$$B_l = \sum_{i=x}^{y} |r_i r_i^*|^{1/n}$$

where $r_i$ represents the received signal sample within a respective bit i within said given portion, where i ranges from x to y, $r_i^*$ represents the complex conjugate of $r_i$, n is a number greater than 1, and $B_l$ represents the accumulated energy within said given portion.

11. The method according to claim 10, wherein n equals 2.

12. The method according to claim 1, wherein the step of calculating using said nonlinear power metric calculates the energy accumulated in said given portion of said control signal according to the formula:

$$B_l = \int_{x}^{y} |r(t) r^*(t)|^{1/n} dt$$

where r(t) represents a function integrated over the range of t=x to t=y corresponding to said given portion, $r^*(t)$ represents the complex conjugate function of r(t), n is a number greater than 1, and $B_l$ represents the accumulated energy within said given portion.

13. The method according to claim 12, wherein n equals 2.

14. The method according to claim 1, wherein the step of calculating using said nonlinear power metric calculates the energy accumulated in said given portion of said control signal according to a combination of at least two of the following formulas:

$$B_l = \sum_{i=x}^{y} \log |r_i|^2 = 2 \sum_{i=x}^{y} \log |s_i + n_i|,$$

$$B_l = \sum_{i=x}^{y} |r_i r_i^*|^{1/n},$$

and $$B_l = \sum_{i=x}^{y} \log |r_i r_i^*|^{1/n}$$

where $r_i$ represents the received signal sample within a respective bit i within said given portion, where i ranges from x to y, $s_i$ and $n_i$ respectively represent the signal and noise components of $r_i$, $r_i^*$ represents the complex conjugate of $r_i$, n is a number greater than 1, and $B_l$ represents the accumulated energy within said given portion.

15. The method according to claim 1, wherein the step of calculating using said nonlinear power metric calculates the energy accumulated in said given portion of said control signal according to a combination of at least two of the following formulas:

$$B_l = \int_{x}^{y} \log |r(t)|^2 dt = 2 \int \log |s(t) + n(t)| dt,$$

$$B_l = \int_{x}^{y} |r(t) r^*(t)|^{1/n} dt,$$

and

-continued $$B_l = \int_x^y \log |r(t)r^*(t)|^{1/n} dt$$

where r(t) represents a function integrated over the range of t=x to t=y corresponding to said given portion, s(t) and n(t) respectively represent signal and noise functions for r(t), r*(t) represents the complex conjugate function of r(t), n is a number greater than 1, and $B_l$ represents the accumulated energy within said given portion.

16. In a communication system having a first communication station and a second communication station, the first and second communication stations, respectively, coupled together by way of a communication channel, a combination with the first and second communication stations of circuitry for synchronizing the second communication station with the first communication station using a nonlinear power metric, said circuitry comprising:
 a control signal generator positioned at the first communication station, said control signal generator for generating and transmitting a control signal upon the communication channel, the control signal being divided into a succession of consecutive multiframes, each of said multiframes comprising a multiplicity of discrete frames therein, and each of said multiframes comprising at least one high-power synchronization signal therein;
 a control signal detector positioned at the second communication station, said control signal detector for detecting the control signal generated and transmitted by said control signal generator;
 selection means, coupled to said detector, for selecting a given portion of the control signal within a given multiframe; and
 calculating means, coupled to said selection means, for calculating the energy accumulated with said given portion using said nonlinear power metric.

17. The communication system according to claim 16, wherein said control signal generator generates and transmits a multiplicity of high-power synchronization signals within each of said multiframes, said synchronization signals being spaced within each multiframe in accordance with a pattern and respectively separated by unequal offsets, a plurality of said multiframes further comprising other, non-synchronization, high-power signals therein;
 wherein said selection means selects a high-power signal within said multiframe;
 wherein said calculating means further calculates the energies accumulated within a plurality of other portions of said control signal, offset from said given portion in accordance with said pattern, and using said nonlinear power metric; and
 further comprising:
  an accumulator for summing the energies within the respective portions of said control signal; and
  comparison means for comparing the energy sum accumulated in said accumulator to a corresponding energy sum for different given and other portions within said given multiframe and determined in accordance with said method, the maximum energy sum within said given multiframe being selected for subsequent fine synchronization.

18. The communication system according to claim 16, wherein said nonlinear power metric is a logarithmic power metric.

19. The communication system according to claim 18, wherein the calculating means calculates the energy accumulated in said given portion of the control signal according to the formula:

$$B_l = \sum_{i=x}^y \log |r_i|^2 = 2 \sum_{i=x}^y \log |s_i + n_i|$$

where $r_i$ represents the received signal sample within a respective bit i within said given portion, where i ranges from x to y, $s_i$ and $n_i$ respectively represent the signal and noise components of $r_i$, and $B_l$ represents the accumulated energy within said given portion.

20. The communication system according to claim 18, wherein the calculating means calculates the energy accumulated in said given portion of the control signal according to the formula:

$$B_l = \int_x^y \log |r(t)|^2 dt = 2 \int_x^y \log |s(t) + n(t)| dt$$

where r(t) represents a function integrated over the range of t=x to t=y corresponding to said given portion, s(t) and n(t) respectively represent signal and noise functions for r(t), and $B_l$ represents the accumulated energy within said given portion.

21. The communication system according to claim 18, wherein the calculating means calculates the energy accumulated in said given portion of said control signal according to the formula:

$$B_l = \sum_{i=x}^y \log |r_i r_i^*|^{1/n}$$

where $r_i$ represents the received signal sample within a respective bit i within said given portion, where i ranges from x to y, $r_i^*$ represents the complex conjugate of $r_i$, n is a number greater than 1, and $B_l$ represents the accumulated energy within said given portion.

22. The communication system according to claim 21, wherein n equals 2.

23. The communication system according to claim 18, wherein the calculating means calculates the energy accumulated in said given portion of said control signal according to the formula:

$$B_l = \int_x^y \log |r(t)r^*(t)|^{1/n}$$

where r(t) represents a function integrated over the range of t=x to t=y corresponding to said given portion, r*(t) represents the complex conjugate function of r(t), n is a number greater than 1, and $B_l$ represents the accumulated energy within said given portion.

24. The communication system according to claim 23, wherein n equals 2.

25. The communication system according to claim 16, wherein the calculating means calculates the energy accumulated in said given portion of said control signal according to the formula:

$$B_l = \sum_{i=x}^{y} |r_i r_i^*|^{1/n}$$

where $r_i$ represents the received signal sample within a respective bit i within said given portion, where i ranges from x to y, $r_i^*$ represents the complex conjugate of $r_i$, n is a number greater than 1, and $B_l$ represents the accumulated energy within said given portion.

26. The communication system according to claim 25, wherein n equals 2.

27. The communication system according to claim 16, wherein the calculating means calculates the energy accumulated in said given portion of said control signal according to the formula:

$$B_l = \int_{x}^{y} |r(t)r^*(t)|^{1/n} dt$$

where r(t) represents a function integrated over the range of t=x to t=y corresponding to said given portion, $r^*(t)$ represents the complex conjugate function of r(t), n is a number greater than 1, and $B_l$ represents the accumulated energy within said given portion.

28. The communication system according to claim 27, wherein n equals 2.

29. The communication system according to claim 16, wherein the calculating means using said nonlinear power metric calculates the energy accumulated in said given portion of said control signal according to a combination of at least two of the following formulas:

$$B_l = \sum_{i=x}^{y} \log |r_i|^2 = 2 \sum_{i=x}^{y} \log |s_i + n_i|,$$

$$B_l = \sum_{i=x}^{y} |r_i r_i^*|^{1/n},$$

and $$B_l = \sum_{i=x}^{y} \log |r_i r_i^*|^{1/n}$$

where $r_i$ represents the received signal sample within a respective bit i within said given portion, where i ranges from x to y, $s_i$ and $n_i$ respectively represent the signal and noise components of $r_i$, $r_i^*$ represents the complex conjugate of $r_i$, n is a number greater than 1, and $B_l$ represents the accumulated energy within said given portion.

30. The communication system according to claim 16, wherein the calculating means using said nonlinear power metric calculates the energy accumulated in said given portion of said control signal according to a combination of at least two of the following formulas:

$$B_l = \int_{x}^{y} \log |r(t)|^2 dt = 2 \int_{x}^{y} \log |s(t) + n(t)| dt$$

$$B_l = \int_{x}^{y} |r(t)r^*(t)|^{1/n} dt,$$

and $$B_l = \int_{x}^{y} \log |r(t)r^*(t)|^{1/n} dt$$

where r(t) represents a function integrated over the range of t=x to t=y corresponding to said given portion, s(t) and n(t) respectively represent signal and noise functions for r(t), $r^*(t)$ represents the complex conjugate function of r(t), n is a number greater than 1, and $B_l$ represents the accumulated energy within said given portion.

31. A receiver synchronizable with a transmitter using a nonlinear power metric, said receiver comprising:
   a control signal detector for detecting transmission of a control signal thereto, the control signal transmitted by the transmitter, the control signal being divided into a succession of consecutive multiframes, each of said multiframes comprising a multiplicity of discrete frames therein, and each of said multiframes comprising at least one high-power synchronization signal therein;
   selection means, coupled to said detector, for selecting a given portion of the control signal within a given multiframe; and
   calculating means, coupled to said selection means, for calculating the energy accumulated with said given portion using said nonlinear power metric.

32. The receiver according to claim 31,
   wherein said control signal generator generates and transmits a multiplicity of high-power synchronization signals within each of said multiframes, said synchronization signals being spaced within each multiframe in accordance with a pattern and respectively separated by unequal offsets, a plurality of said multiframes further comprising other, non-synchronization, high-power signals therein;
   wherein said selection means selects a high-power signal within said multiframe;
   wherein said calculating means further calculates the energies accumulated within a plurality of other portions of said control signal, offset from said given portion in accordance with said pattern, and using said nonlinear power metric; and
   further comprising:
      an accumulator for summing the energies within the given and other portions of said control signal; and
      comparison means for comparing the energy sum accumulated in said accumulator to a corresponding energy sum for different given and other portions within said given multiframe and determined in accordance with said method, the maximum energy sum within said given multiframe being selected for subsequent fine synchronization.

33. The receiver according to claim 31 wherein said nonlinear power metric is a logarithmic power metric.

34. The receiver according to claim 33, wherein the calculating means calculates the energy accumulated in said given portion of said control signal according to the formula:

$$B_l = \sum_{i=x}^{y} \log |r_i r_i^*|^{1/n}$$

where $r_i$ represents the received signal sample within a respective bit i within said given portion, where i ranges from x to y, $r_i^*$ represents the complex conjugate of $r_i$, n is a number greater than 1, and $B_l$ represents the energy accumulated energy within said given portion.

35. The receiver according to claim 34, wherein n equals 2.

36. The receiver according to claim 33, wherein the calculating means calculates the energy accumulated in said given portion of said control signal according to the formula:

$$B_l = \int_x^y \log |r(t)r^*(t)|^{1/n}$$

where r(t) represents a function integrated over the range of t=x to t=y corresponding to said given portion, $r^*(t)$ represents the complex conjugate function of r(t), n is a number greater than 1, and $B_l$ represents the accumulated energy within said given portion.

37. The receiver according to claim 36, wherein n equals 2.

38. The receiver according to claim 31, wherein the calculating means calculates the energy accumulated in said given portion of said control signal according to the formula:

$$B_l = \sum_{i=x}^{y} \log |r_i|^2 = 2 \sum_{i=x}^{y} \log |s_i + n_i|$$

where $r_i$ represents the received signal sample within a respective bit i within said given portion, where i ranges from x to y, $s_i$ and $n_i$ respectively represent the signal and noise components of $r_i$, and $B_l$ represents the accumulated energy within said given portion.

39. The receiver according to claim 31, wherein the calculating means calculates the energy accumulated in said given portion of said control signal according to the formula:

$$B_l = \int_x^y \log |r(t)|^2 dt = 2 \int_x^y \log |s(t) + n(t)| dt$$

where r(t) represents a function integrated over the range of t=x to t=y corresponding to said given portion, s(t) and n(t) respectively represent signal and noise functions for r(t), and $B_l$ represents the accumulated energy within said given portion.

40. The receiver according to claim 31, wherein the calculating means calculates the energy accumulated in said given portion of said control signal according to the formula:

$$B_l = \sum_{i=x}^{y} |r_i r_i^*|^{1/n}$$

where $r_i$ represents the received energy within a respective bit i within said given portion, where i ranges from x to y, $r_i^*$ represents the complex conjugate of $r_i$, n is a number greater than 1, and $B_l$ represents the accumulated energy within said given portion.

41. The receiver according to claim 40, wherein n equals 2.

42. The receiver according to claim 31, wherein the calculating means calculates the energy accumulated in said given portion of said control signal according to the formula:

$$B_l = \int_x^y |r(t)r^*(t)|^{1/n} dt$$

where r(t) represents a function integrated over the range of t=x to t=y corresponding to said given portion, $r^*(t)$ represents the complex conjugate function of r(t), n is a number greater than 1, and $B_l$ represents the accumulated energy within said given portion.

43. The receiver according to claim 42, wherein n equals 2.

44. The receiver according to claim 31, wherein the calculating means using said nonlinear power metric calculates the energy accumulated in said given portion of said control signal according to a combination of at least two of the following formulas:

$$B_l = \sum_{i=x}^{y} \log |r_i|^2 = 2 \sum_{i=x}^{y} \log |s_i + n_i|,$$

$$B_l = \sum_{i=x}^{y} |r_i r_i^*|^{1/n},$$

and $$B_l = \sum_{i=x}^{y} \log |r_i r_i^*|^{1/n}$$

where $r_i$ represents the received signal sample within a respective bit i within said given portion, where i ranges from x to y, $s_i$ and $n_i$ respectively represent the signal and noise components of $r_i$, $r_i^*$ represents the complex conjugate of $r_i$, n is a number greater than 1, and $B_l$ represents the accumulated energy within said given portion.

45. The receiver according to claim 31, wherein the calculating means using said nonlinear power metric calculates the energy accumulated in said given portion of said control signal according to a combination of at least two of the following formulas:

$$B_l = \int_x^y \log |r(t)|^2 dt = 2 \int_x^y \log |s(t) + n(t)| dt$$

$$B_l = \int_x^y |r(t)r^*(t)|^{1/n} dt,$$

and $$B_l = \int_x^y \log |r(t)r^*(t)|^{1/n} dt$$

where r(t) represents a function integrated over the range of t=x to t=y corresponding to said given portion, s(t) and n(t) respectively represent signal and noise functions for r(t), $r^*(t)$ represents the complex conjugate function of r(t), n is a number greater than 1, and $B_l$ represents the accumulated energy within said given portion.

* * * * *